(12) United States Patent
Kawakami

(10) Patent No.: US 6,295,264 B1
(45) Date of Patent: Sep. 25, 2001

(54) OPTICAL DISK DEVICE HAVING COOLING FAN WITH SPEED PROPORTIONAL TO ROTATIONAL SPEED OF SPINDLE MOTOR

(75) Inventor: Hirokazu Kawakami, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/356,028

(22) Filed: Jul. 16, 1999

(30) Foreign Application Priority Data

Jul. 17, 1998 (JP) ................................................. 10-202620

(51) Int. Cl.$^7$ ...................................................... G11B 33/14
(52) U.S. Cl. ............................................ 369/75.1; 361/687
(58) Field of Search ................ 369/75.1, 72; 360/97.02, 360/97.04; 361/684, 685, 687, 688, 694, 695; 236/78 D, DIG. 8, DIG. 9

(56) References Cited

U.S. PATENT DOCUMENTS 4,803,834 * 2/1989 Vogel et al. ............................. 57/308
5,691,948 * 11/1997 Sakabe ................................. 365/227

FOREIGN PATENT DOCUMENTS

| 4-90187 | * | 3/1992 | (JP) . |
| 5-205460 | | 8/1993 | (JP) . |
| 7-272476 | * | 10/1995 | (JP) . |
| 11-15565 | * | 1/1999 | (JP) . |

* cited by examiner

Primary Examiner—Brian E. Miller
(74) Attorney, Agent, or Firm—Foley & Lardner

(57) ABSTRACT

An optical disk device has a spindle motor for rotating a disk, an optical head for writing or retrieving data on the disk, a cooling fan for cooling the device, and a motor for rotating the cooling fan. In one embodiment, the device further has a controller for outputting a control signal for controlling the speed of the spindle motor and the cooling fan. In that embodiment, the device further has first and second drivers for adjusting the current supplied to the spindle motor and the cooling fan motor. In another embodiment, the cooling fan is rotated using the spindle motor, transferring power with a gear and a shaft. In both embodiments, the cooling fan rotates in proportion to, e.g., 1.25 times, the speed of the spindle motor.

7 Claims, 4 Drawing Sheets

OPTICAL DISK DEVICE HAVING COOLING FAN WITH SPEED PROPORTIONAL TO ROTATIONAL SPEED OF SPINDLE MOTOR

BACKGROUND OF THE INVENTION

1. Field of the Invention

The present invention relates to an optical disk device having a cooling fan, in particular, for avoiding waste of power consumption and reducing the operating sound.

This application is based on Patent Application No. Hei 10-202620 filed in Japan, the contents of which are incorporated herein by reference.

2. Description of the Related Art

FIG. 4 is a diagram showing the general structure of a conventional optical disk device. This device comprises spindle motor 17 for rotating disk 16, and optical head 18 for writing or retrieving data of disk 16. Recently, in such conventional optical disk devices (such as CD-ROM drives or DVD (Digital Versatile Disc) drives), the heat radiated by the optical head 18 or spindle motor 17 has increased more and more.

Recent CD-ROM drives have higher rotational speeds in order to improve their performance and specification, and the heat radiated by the motor also increases. On the other hand, DVD drives employ in their pickup a head radiating a high-intensity laser beam, thereby increasing heating of the head. Therefore, such conventional disk drives must be cooled so as to prevent the optical disk device from heating.

SUMMARY OF THE INVENTION

In order to solve the above problem, an objective of the present invention is to provide an optical disk device having a cooling fan, so that the device can be cooled and thus can be prevented from heating.

Therefore, the present invention provides an optical disk device comprising:

a spindle motor for rotating a disk;

an optical head for writing or retrieving data on the disk;

a cooling fan for cooling the inside of the device;

a motor for rotating the cooling fan;

a controller for outputting a control signal for controlling the rotating operations of the spindle motor and the motor of the cooling fan;

a first driver for adjusting current supplied to the spindle motor by using the control signal from the controller; and a second driver for adjusting current supplied to the motor of the cooling fan by using the control signal from the controller, and wherein the cooling fan rotates in proportion to the rotational speed of the spindle motor for rotating the disk.

As the cooling fan is provided in the optical disk device, it is possible to prevent deterioration of the optical head or the disk due to heating of the device. In addition, the cooling fan is rotated in proportion to the rotational speed of the disk; thus, the device can be effectively cooled.

Preferably, the rotational speed of the cooling fan is 1.25 times as fast as the rotational speed of the disk.

Also preferably, if an operation of retrieving data from the disk fails, then the rotational speed of the disk is reduced and the retrieving operation is retried.

Also preferably, while the disk is mounted in the disk drive, if no access is detected for a predetermined time, then the operation of the disk drive is automatically shifted to an energy-saving mode and the rotating operations of the disk and the cooling fan are stopped. In this case, preferably, the energy-saving mode is a stand-by mode or a sleep mode.

Accordingly, when no disk is mounted in the device, or when the disk is not rotated and the optical head is not operated in the stand-by state, the cooling fan is not rotated. Therefore, the consumption of power can be reduced and the operating sound can be reduced.

The present invention also provides an optical disk device comprising:

a spindle motor for rotating a disk;

an optical head for writing or retrieving data on the disk;

a cooling fan for cooling the inside of the device; and a gear and a shaft attached to the spindle motor in a manner such that the cooling fan is rotated via the shaft in accordance with the rotation of the spindle motor so that the power of the spindle motor is directly used for rotating the cooling fan.

Similar effects can be obtained according to this structure.

DESCRIPTION OF THE PREFERRED EMBODIMENTS

Hereinafter, an embodiment of the present invention will be explained with reference to the drawings.

Figure 1:
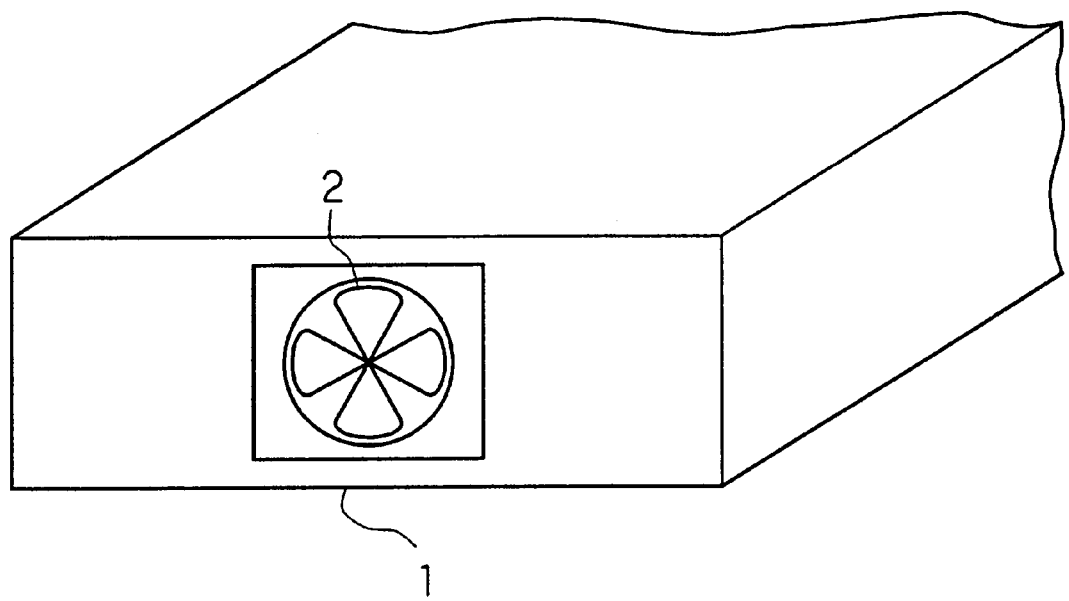
FIG. 1 is a perspective view showing the appearance of the optical disk device as an embodiment according to the present invention.

FIG. 1 is a perspective view showing the appearance of the optical disk device as an embodiment according to the present invention. In this optical disk device, cooling fan 2 for cooling the inside of optical disk device 1 is provided in the rear face of the optical disk device.

Figure 2:
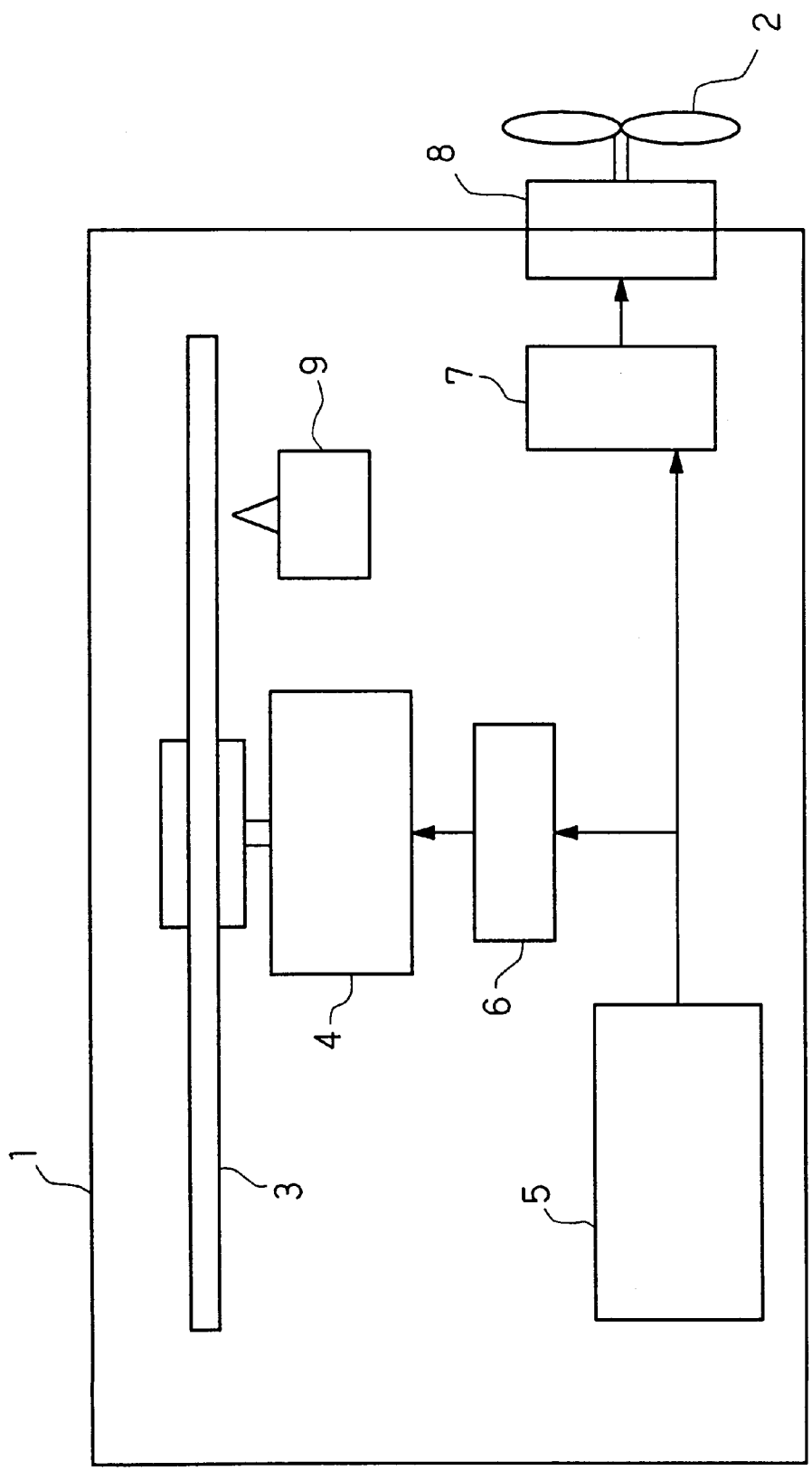
FIG. 2 is a diagram showing the general structure of the optical disk device as an embodiment of the present invention.

FIG. 2 is a diagram showing the general structure of the optical disk device as an embodiment of the present invention. This device comprises spindle motor 4, optical head 9, cooling fan 2, motor 8 for driving the cooling fan, controller 5 for controlling the rotational speeds of the motors, first driver 6 for adjusting the current supplied to spindle motor 4, second driver 7 for adjusting the current supplied to motor 8 for driving the cooling fan, and other necessary components. Here, the operation of the cooling fan 2 is related to the spindle motor 4, and is rotated in proportion to the rotational speed of the spindle motor 4.

The operations of the above optical disk device will be explained with reference to FIG. 2. When disk 3 is mounted in the optical disk device 1, the rotation of the spindle motor 4 is started so as to rotate the disk 3. An information signal for controlling (or adjusting) the rotational speed is output from controller 5 for controlling the spindle motor 4. This signal is input into the first driver 6 of the spindle motor 4. When the first driver 6 detects the information signal of the rotational speed, the driver 6 adjusts the current supplied to spindle motor 4 so that the spindle motor has a rotational speed designated by the information signal.

The information signal for controlling the rotational speed of the spindle motor 4, output from controller 5, is also sent to the second driver 7 of motor 8 for driving the cooling fan. This second driver 7 also uses the above information signal for controlling the rotational speed of the motor 8 for driving the cooling fan 2 (provided in the rear face of the optical disk device 1) so that the rotational speed of motor 8 is proportional to the rotational speed of disk 3. For example, in the case of a maximum 20X optical disk device (here, "1X" is the standard rotational speed for audio CDs), the maximum rotational speed is approximately 4000 rpm, and the rotational speed of cooling fan 2 is set to be 5000 rpm. That is, the cooling fan 2 is rotated at a speed 1.25 times as fast as the rotational speed of disk 3. If the operation of retrieving data from disk 3 fails, then the operation may be retried after the rotational speed of disk 3 is reduced. If the rotational speed of disk 3 is reduced by half and thus the retry operation is performed at 2000 rpm, then the rotational speed (corresponding to "rpm") is also reduced by half and is thus 2500 rpm. In addition, while disk 3 is mounted in the disk device, if no access is detected during a specific time, then the operation mode is automatically shifted to an energy-saving mode such as a stand-by mode or a sleep mode, and the rotation of disk 3 is stopped and the rotation of cooling fan 2 is also stopped.

Figure 3:
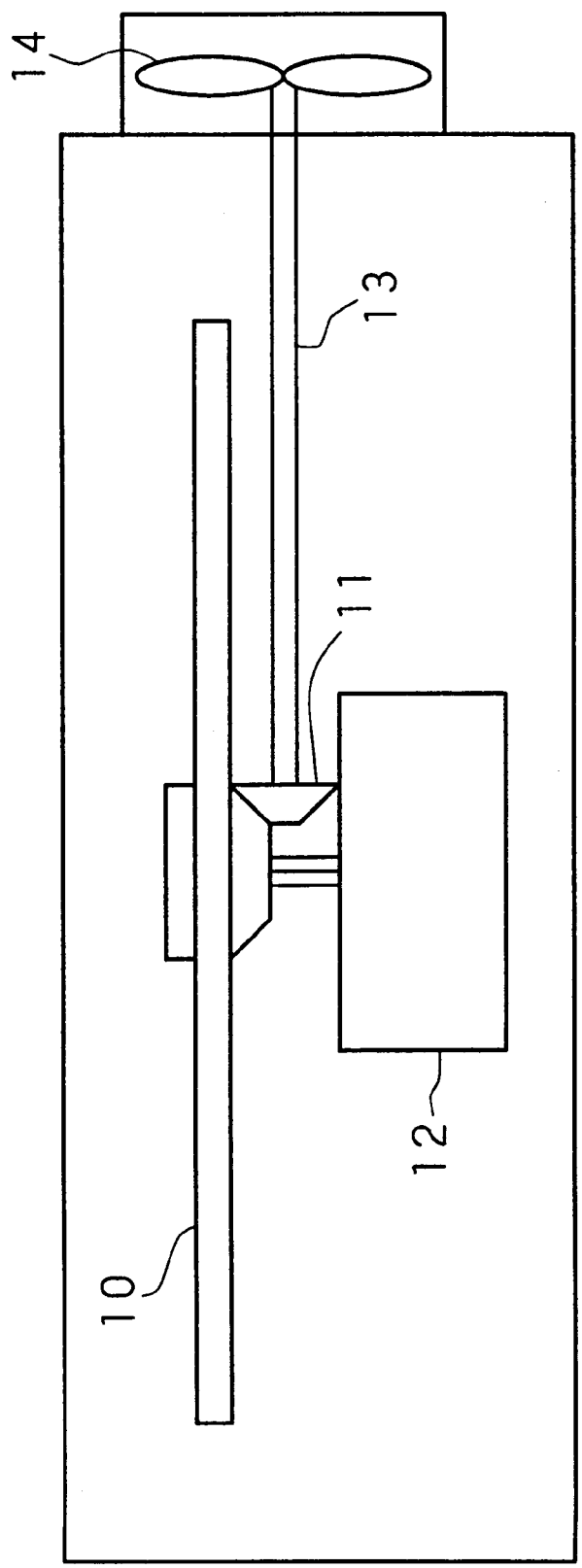
FIG. 3 is a diagram showing the general structure of the optical disk device as another embodiment of the present invention.
Figure 4:
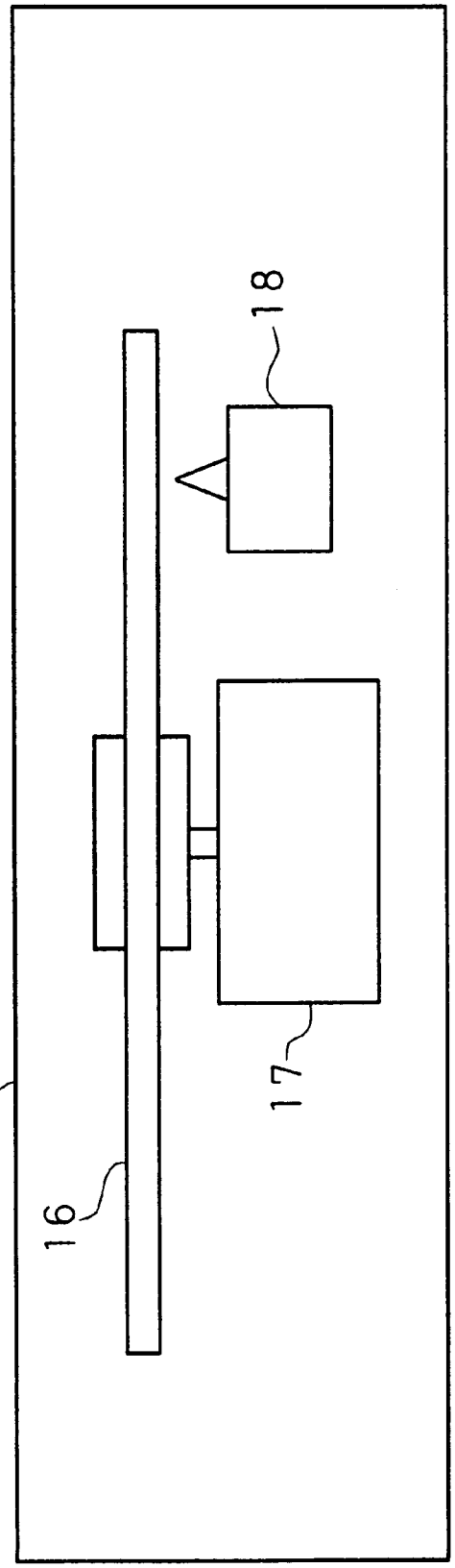
FIG. 4 is a diagram showing the general structure of a conventional optical disk device.

FIG. 3 is a diagram showing the general structure of the optical disk device as another embodiment of the present invention. In the present embodiment, a motor for driving the cooling fan (like motor 8 shown in FIG. 2) is not provided, and as shown in FIG. 3, gear 11 and shaft 13 are attached to spindle motor 12 for rotating the disk 10. In this structure, the power of spindle motor 12 for rotating the disk 10 is directly used for rotating the cooling fan 14.

What is claimed is:

1. An optical disk device comprising:

a spindle motor for rotating a disk;

an optical head for writing or retrieving data on the disk;

a cooling fan for cooling the inside of the device;

a motor for rotating the cooling fan;

a controller for outputting an information signal to control rotating operations of the spindle motor and the motor of the cooling fan;

a first driver for adjusting current supplied to the spindle motor by using the information signal from the controller so that the spindle motor has a rotational speed corresponding to the information signal; and a second driver for adjusting current supplied to the motor of the cooling fan by using the information signal from the controller so that the motor of the cooling fan has a rotational speed corresponding to the information signal, and wherein the rotational speed of the cooling fan rotates in proportion to the rotational speed of the spindle motor for rotating the disk.

2. An optical disk device as claimed in claim 1, wherein the rotational speed of the cooling fan is 1.25 times as fast as the rotational speed of the disk.

3. An optical disk device as claimed in claim 1, wherein if an operation of retrieving data from the disk fails, then the rotational speed of the disk is reduced and the retrieving operation is retried.

4. An optical disk device as claimed in claim 1, wherein while the disk is mounted in the disk drive, if no access is detected for a predetermined time, then the operation of the disk drive is automatically shifted to an energy-saving mode and the rotating operations of the disk and the cooling fan are stopped.

5. An optical disk device as claimed in claim 3, wherein while the disk is mounted in the disk drive, if no access is detected for a predetermined time, then the operation of the disk drive is automatically shifted to an energy-saving mode and the rotating operations of the disk and the cooling fan are stopped.

6. An optical disk device as claimed in claim 4, wherein the energy-saving mode is a stand-by mode or a sleep mode.

7. An optical disk device as claimed in claim 5, wherein the energy-saving mode is a stand-by mode or a sleep mode.

* * * * *